United States Patent
Chang

(10) Patent No.: US 7,324,023 B2
(45) Date of Patent: Jan. 29, 2008

(54) OPTICAL STORAGE DEVICE DECODING METHOD

(75) Inventor: Chia-Yen Chang, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 11/513,275

(22) Filed: Aug. 31, 2006

(65) Prior Publication Data

US 2007/0057823 A1    Mar. 15, 2007

(30) Foreign Application Priority Data

Sep. 14, 2005  (TW) ............................... 94131722 A

(51) Int. Cl.
*H03M 5/00*  (2006.01)
(52) U.S. Cl. .......................................... 341/58; 341/50
(58) Field of Classification Search ............. 341/50–80
See application file for complete search history.

(56) References Cited

U.S. PATENT DOCUMENTS 6,859,761 B2 *  2/2005  Bensky et al. ............... 702/189
7,049,815 B2 *  5/2006  Itskovich et al. ........... 324/303

* cited by examiner

*Primary Examiner*—Lam T. Mai
(74) *Attorney, Agent, or Firm*—Stout, Uxa, Buyan & Mullins, LLP

(57) ABSTRACT

A decoding method for optical storage device, which decodes channel bits upon a disc by partial response maximum likelihood (PRML) detection, is proposed. Unlike the conventional skills, the present method does not decode the detected RF signals directly, but adjusts values of parts of detected RF signals to their original ideal values before channel decoding instead, thereby reducing the decoding error rate of channel bits. The decoding method includes the step of: retrieving a first sequence of RF signals; identifying if the first sequence of RF signals contains a signal combination which satisfies a particular condition; adjusting a plurality of RF signals in the first sequence of RF signals to some pre-determined RF signals' value and then forming a second sequence of RF signals; and decoding the second sequence of RF signals. In a preferred embodiment of the invention, the method is applied to an optical storage system of PR (1,2,2,2,1) channel.

15 Claims, 3 Drawing Sheets

R1=[ 0.2    2.3    3.7    1.8    -0.1 ]

R2=[ 0.2    2    4    2    -0.1 ]

OPTICAL STORAGE DEVICE DECODING METHOD

BACKGROUND OF THE INVENTION

1. Field of the Invention

The present invention relates to a decoding method, and more particularly relates to a decoding method of an optical storage system that reduces the decoding error rate of channel bits by adjusting radio frequency (RF) values of the optical signal.

2. Description of the Prior Art

Encoding method is a very important part of the digital systems, especially the digital communication systems and data storage systems. Generally there are three types of encoding methods: source coding, error control coding, and channel coding. The object of source coding is to transform the information from human or computer to the sequence of digital data, especially binary sequence, and compress contents of the information. The object of error control coding is to encode the sequence of digital data becoming a new sequence of bits with functions of error signal detection and correction. And the object of channel coding is to modify the sequence of bits into communication channel or storage media that transfer or store the data more conveniently and reliably.

The Run-Length Limited (RLL) code is commonly used in the encoding of channel bits upon disc storage devices, such as hard disk, CD-ROM, DVD-ROM. The RLL code is usually represented as RLL(m,n) which means that the number of "0"s between two "1"s is at most n and at least m in the data encoded in the Non-Return-to-Zero (NRZ) rule. For example, there are at most seven "0"s and at least one "0", between two "1"s in the codeword encoded with RLL(1,7).

The data retrieve process in an optical storage system is described below. The pick-up head emits a laser beam to the disc, and the pick-up head then receives the reflection of the laser beam and retrieves the RF values of channel bits by using the partial response maximum likelihood (PRML) detection to recover the recorded data of channel bits. Thereafter, the data of channel bits is decoded by using the error control code to retrieve the data bits. Because of the noise and jitter, the RF values of the detected channel bits usually diverge from the level of the ideal RF values. Thus the decoding results of the back-end channel bits may be affected by the divergence of the RF values.

The error control/correction code is not good enough to reduce the overall data error rate of the optical disc system; especially the current trend is towards increasing the storage density of the discs. The object of the present invention is to provide a decoding method that improves the overall decoding efficiency by reducing the error rate of channel bits.

SUMMARY OF THE INVENTION

An object of the present invention is to provide a decoding method of channel bits upon optical storage systems that improves the reliability of channel bits by adjusting the RF value of receiving optical signals.

Another object of the present invention is to provide a decoding method of optical storage systems that reduces the error rate of the optical storage system by reducing the error rate of channel bits.

Following the description above, the present invention provides a method decodes the channel bits upon a disc by using PRML detection. The decoding method includes the step of: retrieving a first sequence of RF signals; identifying if the first sequence of RF signals contains a specific signal combination which satisfies a particular condition; adjusting a plurality of RF signals in the first sequence of RF signals to some pre-determined RF signals' value and then forming a second sequence of RF signals; and decoding the second sequence of RF signals.

Furthermore, the present invention also provides a decoding method of optical storage systems that decodes channel bits upon a disc by using PRML detection. Wherein the partial response channel is PR(1,2,2,2,1) and the channel bits upon the disc satisfying the RLL(1,N) encoding rule (N is a positive integer greater than 1) and the ideal detected RF signal levels 0, ±2, ±4, ±6, ±8. The decoding method includes the step of: retrieving a sequence of RF signals comprising a sequence (a, b, c), where a, b, c are different RF signal samples; identifying if the sequence (a, b, c) belongs to a particular sequence that the value is (2,4,2) or (−2,−4,−2); adjusting the sequence (a, b, c) to (2,4,2) or (−2,−4,−2) and then decoding the sequence of RF signals.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENT

Figure 1A:
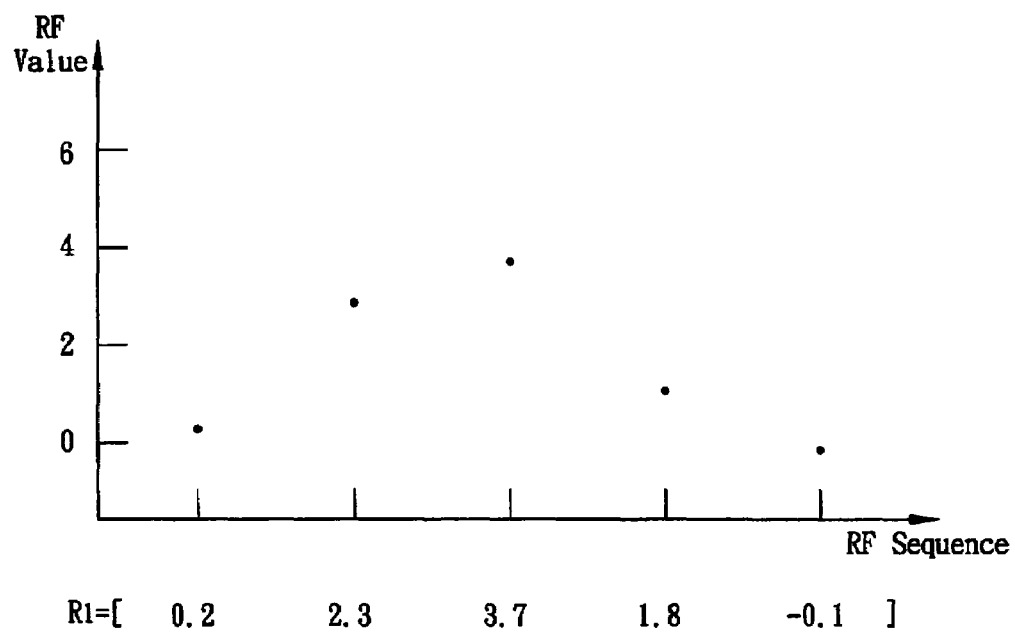
FIG. 1A is a RF sequence R1.

The following detailed description of the present invention describes the optical storage device decoding method necessary to provide an understanding of the present invention, but does not cover a complete structure composition and the operating theory. The portions relating to the conventional techniques are briefly described, and the parts of the drawings are not proportionally drafted. While embodiments are discussed, it is not intended to limit the scope of the present invention. Except expressly restricting the amount of the components, it is appreciated that the quantity of the disclosed components may be greater than that disclosed.

Upon an optical storage disc, a transition from land to pit or from pit to land represents a "1", and all other areas represent a "0". According to the prior art, the number of "0"s between two "1"s is limited to between n at most and m at least by the RLL(m,n). In other words, corresponding to the pits and lands upon an optical storage disc, the RLL code limits the length of each continuous pit and land. In a preferred embodiment of the present invention, a pit is presented as "−1" and a land is presented as "0" by the presentation method of channel bits. For example, a data sequence (−1,−1,1,1,−1) is presented as (0,1,0,1) and a data sequence (1,−1,−1,1,1) is presented as (1,0,1,0) in the general RLL encoding representation. Upon a disc satisfying the RLL encoding rule, a sequence of channel bits is limited that the continuous length of pit or land is at least 2 because the m is at least 1. Thus the sequence of continuous transitions from land to pit or from pit to land such as −1,1,−1 or 1,−1,1 (presented as (1,1) in the general RLL encoding representation) never appears.

The PRML detection utilizes the inter-symbol interference (ISI), i.e. partial response channel PR, to match the channel response between the pick-up head and the disc, and utilizes PRML to detect/determine the channel bits. Thus, the channel bits upon the disc detected by the PRML detection equal to the channel bits output by the partial response channel without noise, i.e. the convolution result of channel bits and the partial response channel model in mathematics. For example, if the channel bits are a sequence (1,−1,−1,−1,1) and the partial response channel model PR is a sequence (1,2,1), then the RF value of the channel bits detected by the PR(1,2,1) equals to the convolution result of the sequence (1,−1,−1,−1,1) and the sequence (1,2,1), i.e. (−2,−4,−2).

Binary data sequences satisfying the rule of RLL encoding outputted by PR(1,2,1), PR(1,2,2,1), or PR(1,2,2,2,1) that are commonly used in the partial response channel model of optical storage systems have fixed pattern. In other words, the convolution result of the partial response channel model described above and the binary data sequence encoded by RLL has some obvious characteristics. And by utilizing these characteristics, the decoding error rate of channel bits in the process of decoding the channel bits upon a disc can be reduced.

For example of PR (1,2,2,2,1), the convolution result of a binary data sequence satisfying the rule of RLL encoding should be on the levels 0, ±2, ±4, ±6, ±8 respectively. Corresponding to the decoding of channels upon a disc, the RF values can only be 0, ±2, ±4, ±6, or ±8. The sequence of RF values can be inversely decoded by the Viterbi algorithm, and thus the channel bits upon the disc are recovered.

Besides the detected RF values are on the particular levels, the ideal RF value that is on the level 4 must be the convolution result of data sequence (−1,1,1,1,−1) and PR (1,2,2,2,1); and the ideal RF value that is on the level −4 must be the convolution result of data sequence (1,−1,−1,−1,1) and PR (1,2,2,2,1). In other words, the output RF value −4 in the ideal situation can only be generated by the data sequence (−1,1,1,1,−1), or the output RF value −4 in the ideal situation can only be generated by the data sequence (1,−1,−1,−1,1). According to the rule of RLL(m,n) encoding, the bits before and behind the data sequence (−1,1,1,1,−1) must equal to −1, and the bits before and behind the data sequence (1,−1,−1,−1,1) must equal to 1. In other words, the data sequence (−1,1,1,1,−1) is represented as V1=(1,0,0,1) in the general encoding representation. To satisfy the RLL encoding rule, i.e. there must be at least one "0" between two "1"s, the bits before and behind V1 must be "0" and the confirmed sequence is (0,V1,0)=(0,1,0,0,1,0). The confirmed sequence represented as the preferred embodiment of the present invention is the sequence (−1,−1,1,1,1,−1,−1), and the data sequence (1,−1,−1,−1,1) can be derived in the same way. Thus, the RF values before and behind the RF value 4 in the ideal situation must equal to 2 (the convolution result of the data sequence (1,1,−1,−1,−1) and PR (1,2,2,2,1) and the convolution result of the data sequence (1,1,1,−1,−1) and PR (1,2,2,2,1) are both 2).

Figure 1B:
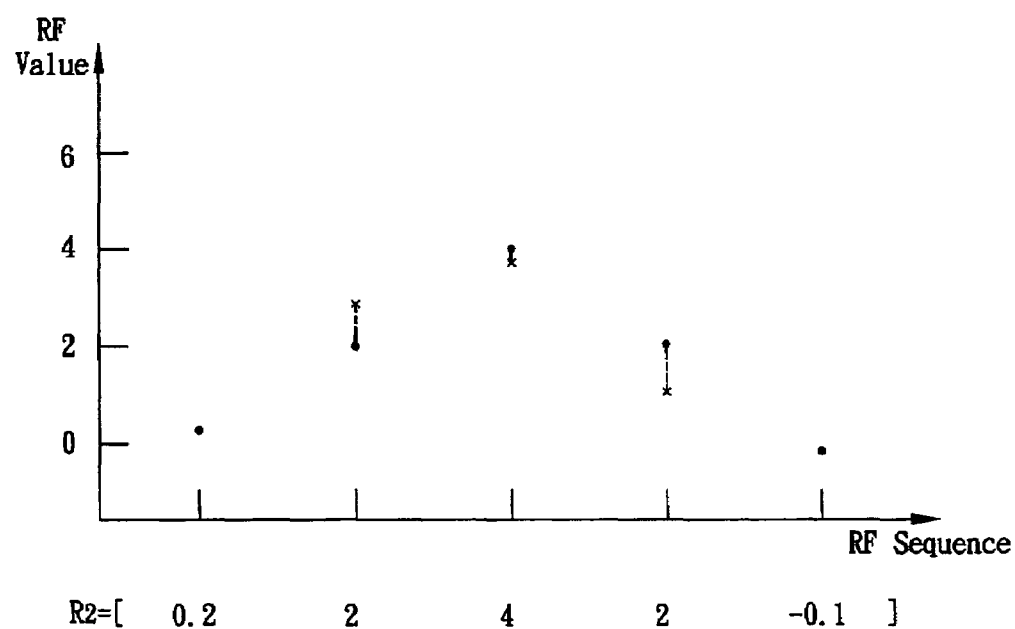
FIG. 1B shows how to adjust the original RF sequence R1 to another RF sequence R2 in the embodiment of the present invention.

The characteristics described above are useful to the channel bits decoding upon a disc. Because of the noise, the RF values detected practically will not be right on the levels 0, ±2, ±4, ±6, or ±8 and possibly diverge a little from the levels. Suppose that a RF sequence R1 which equals to (0.2, 2.3, 3.8, 1.8,−0.1) is detected and the sequence of the ideal RF values is (0,2,4,2,0). Referring to FIG. 1A, the channel bits are recovered directly by decoding of the Viterbi algorithm and soft decision in the prior art. In the present invention, since the RF values before and behind the RF values on level 4 are known that must be 2, the RF values in the sequence R1 that is possible 4 in the ideal situation will be adjusted to 4 and the RF values before and behind will be adjusted to 2 at first, and then the Viterbi decoding will be processed. Referring to FIG. 1B, in this case the value 3.8 is adjusted to 4, and the values 2.3 and 1.8 are both adjusted to 2. After the RF sequence R2=(0.2,2,4,2,−0.1) is retrieved, the Viterbi decoding is processed. Because the noise jamming is removed in the sequence R2 (the three middle RF values are adjusted), the performance of the Viterbi decoding is better than the prior art.

Figure 2A:
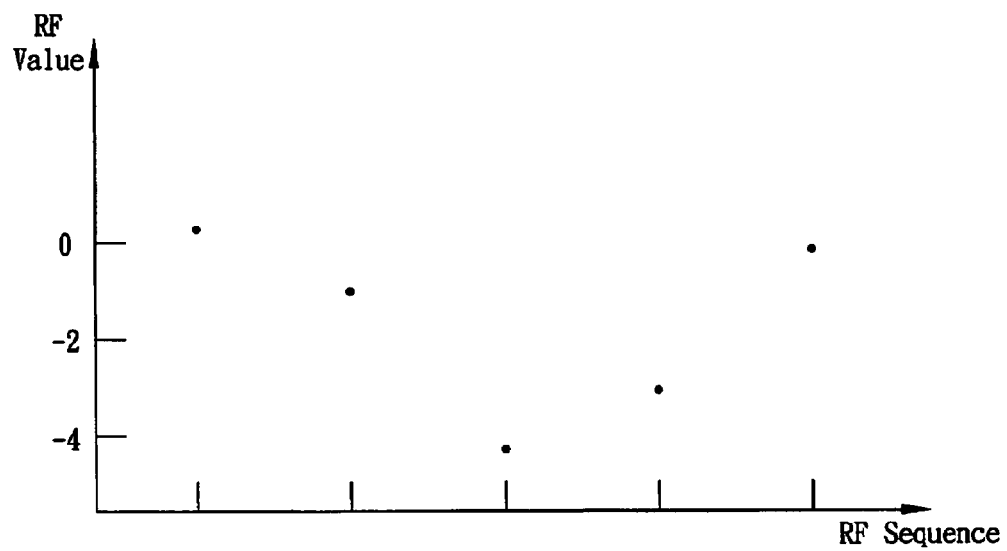
FIG. 2A is a RF sequence R3.
Figure 2B:
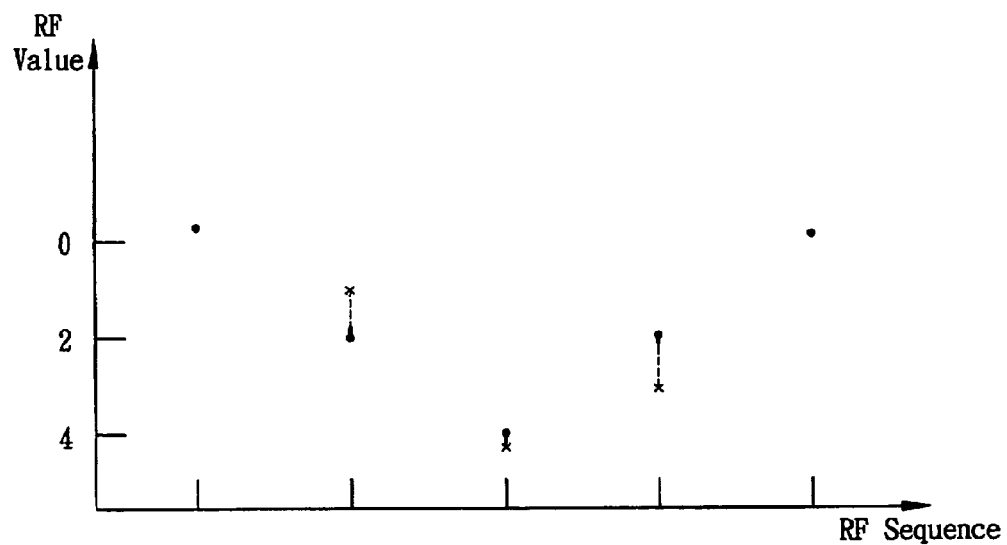
FIG. 2B shows how to adjust the original RF sequence R3 to another RF sequence R4 in the embodiment of the present invention.

The same characteristics occur in the RF values on the level −4. As the description above, the RF values before and behind RF value −4 must be −2. Suppose that a RF sequence R3 which equals to (0.2,−1.8,−4.2,−2.4,−0.1) is detected and the sequence of the ideal RF values is (0,−2,4,−2, 0). Referring to FIG. 2A, R3 is directly decoded in the prior art. And referring to FIG. 2B, in the present invention the RF values −1.8,−4.2,−2.4 are adjusted to −2,4,−2 respectively, and then the RF sequence R4=(0.2,−2,4,−2,−0.1) is decoded.

The key of the method described above is to determine the point which is possible 4 at first and then observe the RF values of the points before and behind the point whose value is 4 if they are greater (or smaller). If and only if the point is possible 4 and the values of the points before and behind the possible point are both smaller (or greater), the three points will be adjusted to 2,4,2 (or −2,4,−2). A simple condition of the determination that the point is possible 4 is the detected point whose value is in the interval between the preset upper bound and lower bound values, for example, the upper and lower bound values of level 4 are preset to 4.3 and 3.7 respectively (−3.7 and 4.3 for level −4). Then the values of the points before and behind are confirmed that are both smaller than the possible point. For example, 2.3, 1.8 are both smaller than 3.8 in the RF sequence R3 described above and −1.8,−2.4 are both greater than 4.2 in R4, thus the points in R3 and R4 will be adjusted.

Thus the sequence (0.3, 2.6, 3.4, 3.6, 2.1) will not be adjusted because 3.4, 3.6 are not in the interval and the sequence (0.3, 2.6, 2.8, 3.9, 3.4) will be adjusted to (0.3, 2.6, 2 ,4 ,2) by the method described above. Therefore the determination of the level 4 can be described as:

---

IF RF(i)<n1 and RF(i)>n2,
    IF (RF(i+1)&&RF(i−1))<RF(i),
        RF(i)=4;
        RF(i+1)=2;
        RF(i−1)=2;
    END
END

---

Wherein RF(i) represents the ith value in the RF sequence. And n1 and n2 represent the upper bound and lower bound value of level 4 respectively that n1>n2 (in the case described above, n1 is 4.3 and n2 is 3.7). In the same way the determination of the level −4 can be described as:

```
IF RF(i)<n3 and RF(i)>n4,
    IF (RF(i+1)&&RF(i-1))>RF(i),
        RF(i)=-4;
        RF(i+1)=-2;
        RF(i-1)=-2;
    END
END
```

Wherein n3 and n4 represent the upper bound and lower bound value of level −4 respectively that n3>n4 (in the case described above, n3 is −3.7 and n4 is −4.3).

Figure 3:
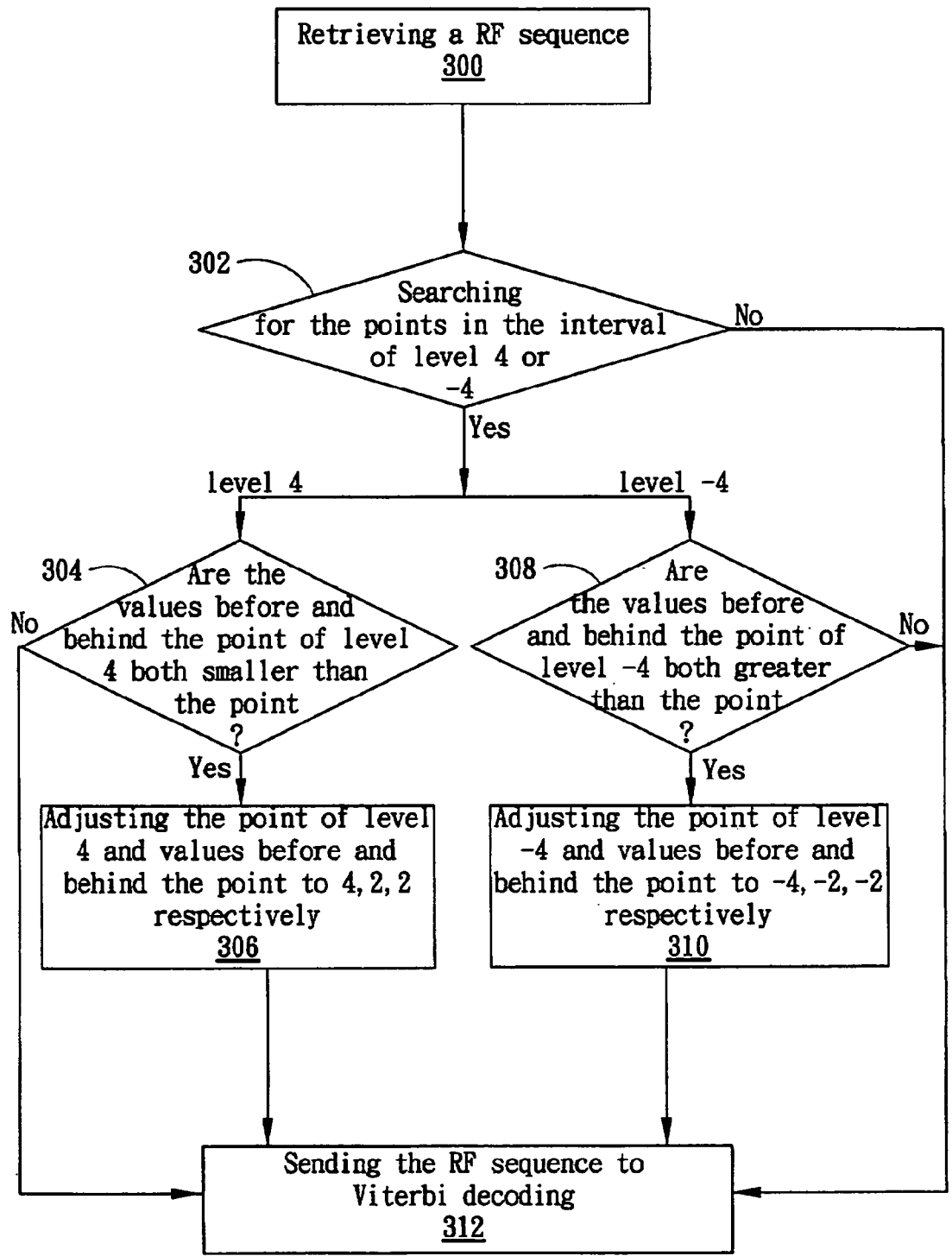
FIG. 3 is the process diagram illustrating the decoding method in the embodiment of the present invention.

Referring to FIG. 3, the decoding method can be utilized in an optical disc system. First, the reflection of laser beams is detected to retrieve a RF sequence (step 300); and then the RF sequence is searched for the points in the interval of level 4 or −4 (step 302), for example, the interval of level −4 is between 3.7 to 4.3 and the interval of level −4 is between −3.7 to −4.3. If there is no point in the intervals, then the RF sequence is sent to Viterbi decoding directly (step 312). If there is a point in the interval of level 4, then the values before and behind the point are determined whether they are both smaller than the point or not (step 304); If the values are both smaller than the point, then the point and the values before and behind are adjusted to 4, 2, 2 respectively (step 306). If the values are not both smaller than the point, then step 312 is processed. Similarly, if there is point in the interval of level −4, then the values before and behind the point are determined whether they are both greater than the point or not (step 308); If the values are both greater than the point, then the point and the values before and behind are adjusted to −4,−2,−2 respectively (step 310). If the values are not both greater than the point, then step 312 is processed.

In brief the present invention utilizes the characteristics of the RLL encoding and the convolution result of partial response channels, especially PR(1,2,2,2,1) channel, to adjust some RF values which satisfy particular conditions. Thus the error rate of channel bits decoding is reduced. The characteristic of points on the RF level 4 and level 4 are the most obvious, especially for the model of PR(1,2,2,2,1) that the values before and behind the points must be 2. Therefore, before the points satisfying the conditions are sent to Viterbi decoding, they are adjusted as the embodiments described above, then the adjusted RF sequence is sent to decoding and thus the error rate of channel bits is reduced.

Furthermore, the present invention can be applied generally, and is not limited to PR(1,2,2,2,1) or RF level 4 or level −4 only. For example, in the data sequence satisfying RLL(1,3) encoding rule and convolution of PR(1,2,2,1) channel, the RF values before and behind the points on the RF level 6 must be 4. This is because the RF value on the level 6 can only be formed by the sequence (1,1,1,1) in the ideal situation. And because the limit of the RLL(1,3) encoding rule, the values before and behind the sequence (1,1,1,1) must be −1, and thus the RF values before and behind the points on level 6 must be 4. If a RF sequence includes the point on the level 6 and the RF values before and behind the point are smaller than the point, then the RF sequence can be adjusted similarly as the method described above. For example, the sequence (0.3, 2.5, 4.4, 5.8, 5.1, 3.4) is adjusted to (0.3, 2.5, 4, 6, 4, 3.4).

Therefore, if the RF value in the ideal situation is known during the period of the RF detection, some of the detected RF values can be adjusted to the RF values in the ideal situation and thus a new RF sequence is formed. The decoding error rate of channel bits is reduced and the accuracy of reading data on the disc by sending the new RF sequence to decoding. Furthermore, the decoding method according to the present invention can be applied generally to optical storage systems such as CD-ROM, DVD−/+R, DVD ROM, and DVD−/+RW.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A decoding method of data on optical storage systems, wherein partial response maximum likelihood (PRML) detection is applied to decode sequence of channel bits on a disc, comprising:
  retrieving a first sequence of RF signals;
  determining said first sequence of RF signals whether contains a signal combination which satisfies a particular condition;
  adjusting a plurality of RF signals in said first sequence of RF signals to particular ideal RF signals and then forming a second sequence of RF signals; and
  decoding said second sequence of RF signals.

2. The decoding method of claim 1, wherein said sequence of channel bits on said disc is encoded by Run-Length Limited (RLL) code.

3. The decoding method of claim 1, wherein said signal combination which satisfies the particular condition has a plurality of RF signals which satisfies particular signal levels and patterns in said first sequence of RF signals.

4. The decoding method of claim 1, wherein said second sequence of RF signals is decoded by partial response maximum likelihood (PRML) detection.

5. The decoding method of claim 4, wherein said PRML detection is embodied by Viterbi algorithm.

6. The decoding method of claim 1, further comprising:
  retrieving said first sequence of RF signals by sending said sequence of channel bits on said disc through a partial response channel.

7. The decoding method of claim 1, wherein said optical storage systems comprises CD-ROM, DVD−/+R, DVD-ROM, or DVD−/+RW.

8. A decoding method of data on optical storage systems, wherein PRML detection is applied to decode a sequence of channel bits on a disc, partial response channel is PR(1,2,2,2,1), said sequence of channel bits on said disc satisfies the rule of RLL (1,n) encoding wherein n is a positive integer greater than 1, and RF signals detected in the ideal situation comprises levels 0, ±2, ±4, ±6, ±8, comprising:
  retrieving a sequence of RF signals comprising a sequence (a, b, c);
  determining whether said sequence (a, b, c) is a particular sequence whose value is (2, 4, 2);
  adjusting said sequence (a, b, c) to (2, 4, 2); and
  decoding said sequence of RF signals.

9. The decoding method of claim 8, wherein said determining whether said sequence (a, b, c) is a particular sequence whose value is (2, 4, 2) further comprises:

determining whether said sequence (a, b, c) is a particular sequence whose value is (2, 4, 2) by according to whether b is in a interval (m1, m2) and a and c are both smaller than b, wherein 2<m1<4<m2<6.

10. A decoding method of data on optical storage systems, wherein PRML detection is applied to decode a sequence of channel bits on a disc, partial response channel is PR (1,2,2,2,1), said sequence of channel bits on said disc satisfies the rule of RLL (1,n) encoding wherein n is a positive integer greater than 1, and RF signals detected in the ideal situation comprises levels 0, ±2, ±4, ±6, ±8, comprising:

retrieving a sequence of RF signals comprising a sequence (a, b, c);

determining whether said sequence (a, b, c) is a particular sequence whose value is (−2, −4, −2);

adjusting said sequence (a, b, c) to (−2, 4, −2); and decoding said sequence of RF signals.

11. The decoding method of claim 10, wherein said determining whether said sequence (a, b, c) is a particular sequence whose value is (−2, 4, −2) further comprises:

determining whether said sequence (a, b, c) is a particular sequence whose value is (−2, −4, −2) in accordance with whether b is in a interval (n1, n2) and a and c are both greater than b, wherein −2>n1>−4>n2>−6.

12. A decoding method of data on optical storage systems, wherein PRML detection is applied to decode a sequence of channel bits on a disc, partial response channel is PR (1,2,2,2,1), said sequence of channel bits on said disc satisfies the rule of RLL (1,n) encoding wherein n is a positive integer greater than 1, and RF signals detected in the ideal situation comprises levels 0, ±2, ±4, ±6, ±8, comprising:

retrieving a sequence of RF signals comprising a sequence (a, b, c);

determining whether said sequence (a, b, c) is a particular sequence whose value is (2 ,4 ,2) or (−2, −4, −2);

adjusting said sequence (a, b, c) to (2, 4, 2) or (−2, −4, −2); and decoding said sequence of RF signals.

13. The decoding method of claim 12, wherein said determining whether said sequence (a, b, c) is a particular sequence whose value is (2, 4, 2) or (−2, −4, −2) further comprises:

determining whether said sequence (a, b, c) is a particular sequence whose value is (2, 4, 2) by according to whether b is in a interval (m1, m2) and a and c are both smaller than b, wherein 2<m1<4<m2<6; and determining whether said sequence (a, b, c) is the particular sequence whose value is (−2, −4, −2) in accordance with whether b is in a interval (n1, n2) and a and c are both greater than b, wherein −2>n1>−4>n2>−6.

14. The decoding method of claim 12, wherein said sequence of RF signals is decoded by PRML detection.

15. The decoding method of claim 14, wherein said PRML detection is performed by Viterbi algorithm.

* * * * *

UNITED STATES PATENT AND TRADEMARK OFFICE
CERTIFICATE OF CORRECTION

| | |
|---|---|
| PATENT NO. | : 7,324,023 B2 |
| APPLICATION NO. | : 11/513275 |
| DATED | : January 29, 2008 |
| INVENTOR(S) | : Chia-Yen Chang |

It is certified that error appears in the above-identified patent and that said Letters Patent is hereby corrected as shown below:

On the Title Page, Item (73) should read, "Lite-On IT Corporation (Taipei City, TW)".

Signed and Sealed this

Ninth Day of December, 2008

JON W. DUDAS
*Director of the United States Patent and Trademark Office*